(12) United States Patent
Min et al.

(10) Patent No.: US 8,757,351 B2
(45) Date of Patent: Jun. 24, 2014

(54) DEVICE FOR FOLDING ELECTRODE ASSEMBLY

(71) Applicant: LG Chem, Ltd., Seoul (KR)

(72) Inventors: Ki Hong Min, Gwacheon-si (KR); Sung Min Hwang, Cheongju-si (KR); Jihoon Cho, Daejeon (KR); TaeYoon Jung, Chungcheongbuk-do (KR); Jeong Sam Son, Cheongju-si (KR); Changmin Han, Cheongju-si (KR); Su Taek Jung, Cheongju-si (KR); Byung Taek Yang, Cheongju-si (KR); Hyun-sook Baik, Cheongju-si (KR); Seok Joo Jung, Cheongju-si (KR); Ki Hun Song, Hwaseong-si (KR); Sang Hyuck Park, Suwon-si (KR); Han Sung Lee, Incheon (KR); Byeong Geun Kim, Anyang-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/891,669

(22) Filed: May 10, 2013

(65) Prior Publication Data

US 2013/0240323 A1    Sep. 19, 2013

Related U.S. Application Data

(63) Continuation of application No. PCT/KR2011/008484, filed on Nov. 9, 2011.

(30) Foreign Application Priority Data

Dec. 2, 2010 (KR) .................. 10-2010-0122332

(51) Int. Cl.
*H01M 4/88* (2006.01)

(52) U.S. Cl.
USPC .............................................. 198/340

(58) Field of Classification Search
None
See application file for complete search history.

(56) References Cited

U.S. PATENT DOCUMENTS

| 3,846,879 | A  | * | 11/1974 | Jenkins  ..................... | 29/2 |
| 6,444,356 | B1 | * | 9/2002  | Ma et al. ................... | 429/145 |
| 6,841,728 | B2 | * | 1/2005  | Jones et al. ................ | 136/244 |

FOREIGN PATENT DOCUMENTS

| KR | 10-0696892 B1    | 3/2007 |
| KR | 10-2008-0105852 A | 12/2008 |
| KR | 10-2009-0101330 A | 9/2009 |
| KR | 10-2010-0121366 A | 11/2010 |

OTHER PUBLICATIONS

International search report issued in PCT/KR2011/008484 mailed Jun. 26, 2012.

* cited by examiner

*Primary Examiner* — Kavel Singh
(74) *Attorney, Agent, or Firm* — Birch, Stewart, Kolasch & Birch, LLP

(57) ABSTRACT

Disclosed is a unit cell transfer apparatus for arranging and delivering unit cells to a folding device, which is used in a continuous process for manufacturing a stack/folding type electrode assembly having a structure of planar unit cells wound up over a separate film.

15 Claims, 3 Drawing Sheets

DEVICE FOR FOLDING ELECTRODE ASSEMBLY

CROSS-REFERENCE TO RELATED APPLICATIONS

This application is a Continuation of PCT International Application No. PCT/KR2011/008484 filed on Nov. 9, 2011, which claims the benefit to Patent Application No. 10-2010-0122332 filed in the Republic of Korea on Dec. 2, 2010. The entire contents of all of the above applications are hereby expressly incorporated by reference into the present application.

TECHNICAL FIELD

The present invention relates to a folding device for an electrode assembly and, more particularly, a unit cell transfer apparatus for arranging and delivering unit cells to a folding device, which is used in a continuous process for manufacturing a stack/folding type electrode assembly having a structure of planar unit cells wound up over a separate film, including: a unit cell feeder to introduce unit cells in sequential order; a position checking part that takes pictures (or captures images) of positions of the unit cell in the unit cell feeder to acquire an image signal and then transmits the image signal to a control part described below; the control part that confirms alignment of the unit cells on the basis of image signals received by the checking part to control behavior of grippers described below; two or more grippers, each of which grips unit cells fed from the cell feeder one unit at a time and then transfers the unit cells to a transfer part described above, after position compensation of the unit cell according to the position compensation signal provided by the control part; and the unit cell transfer part for delivering the unit cells described above to a folding device.

BACKGROUND ART

As technological development of mobile instruments and demands thereof continue to increase, demand for batteries as an energy source is also increasing. Among such secondary batteries, a lithium secondary battery having high energy density and action potential, a long cycle life and reduced self discharge has been made commercially available and has entered widespread of use in the art.

An electrode assembly having a cathode/separator/anode structure to form a secondary battery may be broadly classified into a jelly-roll (winding type) assembly and a stack (laminate type) assembly, in terms of structure thereof. The jelly-roll type electrode assembly may be fabricated by applying an electrode active material to a metal foil used as a current collector, drying and pressing the same, cutting off the pressed material into a band form having desired width and length, isolating an anode and a cathode using a separator, and winding the band form product in a spiral form. Although the jelly-roll type electrode assembly is suited to formation of a cylindrical battery, it has disadvantages such as detachment of an electrode active material, low space utility, etc. in application to an angular or pouch type battery. On the other hand, a stack type electrode assembly comprises a structure of sequentially stacking plural cathode and anode units, and has an advantage of easily forming an angular battery. However, there are incurred problems such as complicated processes in fabricating the assembly and short circuit occurring due to thrust of an electrode when external impact is applied thereto.

In order to overcome the foregoing problems, an electrode assembly having an improved structure, which is a combination of the jelly-roll type and the stack type assemblies described above, has been developed and called a 'stack/folding type electrode assembly' wherein a full cell having a predetermined unit size of a cathode/separator/anode structure or a bi-cell having a predetermined unit size of a cathode (anode)/separator/anode (cathode)/separator/cathode (anode) structure is folded using a continuous separator film having a long length and has been described in detail in published documents, for example, in Korean Laid-Open Patent Publications Nos. 2001-0082058, 2001-0082059 and 2001-0082060, the disclosures of which are incorporated herein by reference in their entireties. Herein, the electrode assembly having such a structure as described above may be referred to as a stack/folding type electrode assembly.

A secondary battery having a structure of a stack type or stack/folding type electrode assembly mounted in the battery case may have different shapes, and a representative example thereof may be a lithium ion polymer battery (LiPB) using a pouch type case made of an aluminum laminate sheet.

The lithium ion polymer battery (LiPB) may have a structure comprising an electrode assembly impregnated with electrolyte wherein the assembly consists of electrodes (cathode and anode) and a separator thermally fused to each other, and a stack type or stack/folding type electrode assembly sealed in a pouch type case formed of an aluminum laminate sheet is mostly used. Accordingly, the lithium ion polymer battery may often be called a 'pouch type battery'

As described above, in order to fabricate a stack type or stack/folding type electrode assembly, respective unit cells (full cells or bi-cells) should be aligned and wound over a separate film. If the unit cells are even slightly misaligned when the unit cells are laminated at a predetermined interval, a failure may occur during testing after completing the manufacture of a battery. Or, a problem of voltage decrease in charging-discharging after testing the battery may be caused.

Accordingly, there is still a strong need for techniques to solve conventional problems described above.

DISCLOSURE

Technical Problem

Therefore, the present invention is directed to solving conventional problems described above and to overcoming technical restrictions in the related art.

As a result of extensive and intensive studies and experimentation, with regard to a continuous process for manufacturing a stack/folding type electrode assembly having a construction of planar unit cells wound over a separate film, a unit cell transfer apparatus having a specific structure consisting of a unit cell feeder, a position checking part, a control part, two or more grippers and a unit cell transfer part, has been developed as described below. Also, it was confirmed that the unit cells are suitably aligned during folding by a simple working process, in the case where such a unit cell transfer apparatus is used in a continuous process for manufacturing a stack/folding type electrode assembly, thereby completing the present invention.

Technical Solution

Accordingly, the present invention provides a unit cell transfer apparatus for aligning and transferring unit cells to a folding device in a continuous process for manufacturing a stack/folding type electrode assembly having a structure of planar unit cells wound over a separate film, which has a construction of:

a unit cell feeder to sequentially introduce the unit cells;

a position checking part that captures an image of a position of a unit cell in the unit cell feeder and transmits the acquired image signal to a control part described below;

the control part that checks alignment of the unit cells based on the acquired image signals and controls behavior of grippers described below;

at least two grippers that grip the unit cells fed from the cell feeder one unit at a time, compensates a position of the unit cell according to a position compensation signal output from the control part and transfers the results to a (unit cell) transfer part described below; and a unit cell transfer part for transferring the unit cells to a folding device.

According to the present invention, the unit cell may be, for example, a full cell or bi-cell.

The full cell is a cell consisting of a unit structure of cathode/separator/anode, wherein the cathode and the anode are positioned at both ends of the cell, respectively. Such a full cell may be a cell having a primary structure of cathode/separator/anode, or comprise a cathode/separator/anode/separator/cathode/separator/anode structure.

Alternatively, the bi-cell may comprise a cell having identical electrodes positioned at both ends of the cell, such as a cathode/separator/anode/separator/cathode unit structure or an anode/separator/cathode/separator/anode unit structure. In the description, a cell having a cathode/separator/anode/separator/cathode structure may be referred to as "C type bi-cell" while a cell having an anode/separator/cathode/separator/anode structure may be called "A type bi-cell." That is, C type bi-cell includes cathodes positioned on both sides of the cell while A type bi-cell includes anodes positioned on both sides thereof.

Such a bi-cell is not particularly restricted in terms of numbers of cathodes, anodes and/or separators thereof so long as the electrodes provided at both sides of the cell have the same construction.

The full-cell and the bi-cell may be fabricated by inter-combining a cathode and an anode while interposing a separator therebetween. Such combination may be performed by, for example, thermal fusion.

A cathode in each of the full cell and the bi-cell may be fabricated by, for example, applying a mixture of a cathode active material, a conductive material and a binder to a cathode current collector, and drying and pressing the coated material. Optionally, a filler may be added to the mixture.

The cathode current collector described above is generally fabricated to have a thickness in the range of 3 to 500 μm. Such cathode current collector is not particularly restricted so long as it has conductivity without causing chemical modification of a battery. For example, the cathode current collector may be fabricated using stainless steel, aluminum, nickel, titanium, calcined carbon, or aluminum or stainless steel surface-treated with carbon, nickel, titanium or silver, and so forth. The current collector may be processed to have fine irregularities on the surface thereof, so as to enhance adhesion to an electrode active material. In addition, the current collector may have various forms including films, sheets, foils, nets, porous structures, foams, non-woven fabrics, etc.

The cathode active material may comprise a lithium transition metal oxide, which contains two or more transition metals, for example; a lamellar compound such as lithium cobalt oxide ($LiCoO_2$), lithium nickel oxide ($LiNiO_2$), etc. which is substituted with one or more transition metals; lithium manganese oxide represented by $Li_{1+x}Mn_{2-x}O_4$ (wherein x ranges from 0 to 0.33) such as $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$, etc.; Ni site type lithium nickel oxide represented by $LiNi_{1-x}M_xO_2$ (wherein M=Co, Mn, Al, Cu, Fe, Mg, B or Ga, and x=0.01 to 0.3); lithium manganese composite oxide represented by $LiMn_{2-x}M_xO_2$ (wherein M=Co, Ni, Fe, Cr, Zn or Ta, and x=0.01 to 0.1) or $Li_2Mn_3MO_8$ (wherein M=Fe, Co, Ni, Cu or Zn); $LiMn_2O_4$ in which Li is partially substituted by alkali-earth metal ions; disulfide compounds; $Fe_2(MoO_4)_3$, and so forth, without being particularly limited thereto.

The conductive material is generally added in an amount of 1 to 30 wt. % relative to a total weight of a mixture including the cathode active material. Such conductive material is not particularly restricted so long as it has conductive properties without causing chemical modification of the battery. The conductive material may include, for example: graphite such as natural graphite or artificial graphite; carbon black such as carbon black, acetylene black, ketchen black, channel black, furnace black, lamp black, summer black, etc.; conductive fibers such as carbon fiber or metal fiber; metal powder such as carbon fluoride, aluminum, nickel powder, etc.; conductive whiskers such as zinc oxide, potassium titanate, etc.; conductive metal oxides such as titanium oxide; conductive substances such as polyphenylene derivatives, and the like.

The binder described above assists in combination of an active material with a conductive material and bonding to a current collector and is normally added in an amount of 1 to 30 wt. %, relative to a total weight of a mixture containing a cathode active material. Examples of such binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorinated rubber, various copolymers, and so forth.

The filler is a supplementary ingredient to inhibit expansion of a cathode, is optionally used and is not particularly restricted so long as it comprises fibrous materials without causing chemical modification of a battery. The filler may include, for example, olefin polymers such as polyethylene, polypropylene, etc., fibrous materials such as glass fiber or carbon fiber, and so forth.

Meanwhile, the anode used herein is fabricated by applying an anode active material to an anode current collector, and drying and pressing the same, and optionally, the conductive material, the binder, the filler, etc. may be further included as described above.

The anode current collector is generally fabricated to have a thickness in the range of 3 to 500 μm. Such anode current collector is not particularly restricted so long as it has high conductivity without causing chemical modification of a battery. For example, the anode current collector may be fabricated using copper, stainless steel, aluminum, nickel, titanium, calcined carbon, copper or stainless steel surface-treated with carbon, nickel, titanium or silver, aluminum-cadmium alloy, and so forth. Similar to the cathode current collector, the anode current collector may be processed to have fine irregularities on the surface thereof, so as to enhance adhesion to an electrode active material. In addition, the anode current collector may have various forms including films, sheets, foils, nets, porous structures, foams, non-woven fabrics, etc.

Examples of the anode active material may include: carbon such as non-graphitizing carbon (often referred to as 'hard carbon'), graphite carbon, etc.; a metal composite oxide such as $Li_xFe_2O_3$ (0≤x1), $Li_xWO_2$ (0x1), $Sn_xMe_{1-x}Me'_yO_z$ (Me=Mn, Fe, Pb, Ge; Me'=Al, B, P, Si, Group I, II, III elements (in periodic table), halogen; 0<x≤1; 1≤y≤3; 1≤z≤8); lithium metal; lithium alloys; silicon alloys; tin alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers such as polyacetylene; Li—Co—Li materials, and so forth.

The separator used herein is interposed between the cathode and the anode and may be formed using a thin insulation film having a high ion permeability and excellent mechanical strength. The separator typically has a pore diameter of 0.01 to 10 μm and a thickness of 5 to 300 μm. As the separator, a sheet or non-woven fabric made of olefin polymer such as polypropylene and/or glass fibers or polyethylene, which have chemical resistance and hydrophobicity, are used. When a solid electrolyte comprising polymer is employed as the electrolyte, the solid electrolyte may also serve as the separator.

In the present invention, the unit cell feeder may be any apparatus or structure capable of sequentially introducing unit cells, without particular limitation. As a preferable example, a conveyor belt may be used. In the case in which the conveyor belt is used to feed unit cells, the unit cells may be loaded on top of the conveyor belt and continuously introduced.

The checking part may include, for example, a camera mounted on the top of the unit cell feeder to capture an image of the position of a unit cell before the unit cell is delivered. The camera may capture an image of the entirety of the top face of the unit cell or, otherwise, a part thereof. Since the unit cell has predetermined dimensions, information required for compensation can be acquired by capturing an image of even a part of the unit cell. Therefore, the camera is preferably constructed to capture an image of a part of the unit cell. As a result of such construction, even when a unit cell partially overlaps another one, the checking part may generate an image signal of a position of the unit cell partially hidden due to overlapping, thus imparting flexibility to process design. That is, when unit cells mutually and partially overlap in a (manufacturing) process to decrease a movement distance, thus attaining improvement in productivity, useful position information may be acquired.

According to a preferred embodiment, the checking part may generate image signals acquired by capturing images of both edges of one face of a unit cell.

The control part may compare the arrangement of unit cells according to the image signal with a preset arrangement and, if there is a difference between the unit cell arrangement and the preset arrangement, transmit a position compensation signal for compensating for the difference to a gripper.

For instance, in the case where the arrangement of unit cells according to the image signal is compared with the preset arrangement and it is known from the result that the former is deflected in one direction, the control part may transmit a compensation signal to compensate for a deflected length in an opposing direction the gripper.

Herein, the preset arrangement may refer to information regarding a standard positive arrangement of a specific unit cell in a subject (manufacturing) process. In the present description, the control part may estimate a deviation in position of the unit cell arrangement out of the positive arrangement by overlapping and comparing an arrangement of unit cells acquired from the image signal with the foregoing positive arrangement. As described above, if the checking part captures an image of both edges of one face of the unit cell and forms an image signal, positive arrangement information of both edges may be stored in the control part, in turn being compared to the unit cell arrangement provided by the checking part.

Meanwhile, the gripper is not particularly limited in terms of structure thereof, so long as it may deliver each unit cell to a unit cell transfer part while compensating for a position of the unit cell according to position compensation information afforded by the control part.

Preferably, the gripper may comprise a first gripper and a second gripper to grip the unit cells by turns, wherein the second gripper returns to a gripping position while the first gripper grips a unit cell and delivers it to a unit cell transfer part, and starts to transfer (the following) unit cell at a point of time at which a delivery process of the first gripper is terminated.

In order to realize the movement described above, for instance, the first gripper and the second gripper may be located at left and right sides relative to a direction of moving unit cells to the unit cell transfer part.

The unit cell transfer part may receive the unit cell from the gripper and then transfer the same to a folding device and, for instance, comprise a conveyer belt. According to one particular embodiment, the unit cell transfer part may have a pair of conveyer belts arranged to face each other while rotating in opposite directions, wherein the unit cell may be inserted between the conveyer belts and delivered.

According to a preferred embodiment, the unit cell feeder and the unit cell transfer part may be adjacent to each other, and have a vertical step at the adjacent site between the unit cell feeder and the unit cell transfer part such that unit cells in the unit cell feeder move vertically and are delivered to the unit cell transfer part.

If the vertical step is provided as described above, a delivery time in a length direction may be decreased by compensating for a position of the unit cell while vertically transferring the same.

More particularly, according to a structure wherein each of the unit cell feeder and the unit cell transfer part has a vertical step, a second unit cell may be provided to a site where a photographic image is captured while a first unit cell migrates vertically during transfer. That is, the second unit cell may move to an overlap position at the bottom of the first unit cell while the first unit cell migrates vertically relative to the vertical step and is transferred to the unit cell feeder.

In this case, as described above, the checking part may generate an image signal acquired by capturing an image of a part of the unit cell and then transfer the same to the control part, thereby increasing processing speed.

Preferably, a protruded sill may be formed outside a driven roller in the unit cell feeder adjacent to the unit cell transfer part, wherein the sill may contact a front part of the second unit cell to stop movement of the unit cell when the gripper grips the unit cell.

In order to capture an image of the unit cell using the camera in the checking part, the unit cell should stop. Also, a feeding speed of the unit cell feeder may be faster than a transfer speed of the unit cell transfer part in order to offset the stoppage time.

According to a preferred embodiment, a second unit cell migrates from the feeder to a position of the checking part, at which a photographic image is captured, while a first unit cell is delivered by the first gripper. In this case, the first unit cell and the second unit cell vertically and partially overlap each other, and the camera in the checking part captures images of both edges of a non-overlapped face of the second unit cell, acquires and generates an image signal, and transmits the image signal to the control part. Then, the control part determines and transmits a position compensation signal to the second gripper. The second gripper receives the position compensation signal and delivers the second unit cell. Also, the first gripper returns to an original position thereof while the second gripper delivers the second unit cell. Such a series of procedures may be repeated.

If the vertical step is too low, scratches may occur between the unit cells. On the contrary, if the vertical step is too high, a vertical transfer distance may be extended which in turn does not enhance processing speed. Accordingly, the vertical step between the unit cell feeder and the unit cell transfer part may range from 3 to 10 mm and, more preferably, 4 to 7 mm in consideration of the foregoing reasons.

The vertical step may have a construction of the unit cell transfer part positioned above or, otherwise, under the unit cell feeder. In the case where the unit cell feeder is a conveyer belt, unit cells are loaded on top of the conveyer belt and introduced. Therefore, it may be more effective to provide the unit cell transfer part above the unit cell feeder, thus simplifying movement of the gripper.

The present invention also provides a stack/folding type electrode assembly fabricated using the foregoing apparatus, as well as a lithium secondary battery comprising the foregoing electrode assembly and a lithium salt-containing non-aqueous electrolyte.

The non-aqueous electrolyte containing lithium salt used herein comprises a lithium salt as well as an electrolyte. The electrolyte may be a non-aqueous organic solvent, organic solid electrolyte, inorganic solid electrolyte, or the like.

The non-aqueous organic solvent may be an aprotic organic solvent including, for example: N-methyl-2-pyrrolidinone; propylene carbonate; ethylene carbonate; butylene carbonate; dimethyl carbonate; diethyl carbonate; γ-butyrolactone; 1,2-dimethoxyethane; tetrahydroxyfuran; 2-methyl tetrahydrofuran; dimethyl sulfoxide; 1,3-dioxolane; formamide; dimethyl formamide; dioxolane; acetonitrile; nitromethane; methyl formate; methyl acetate; phosphoric triester; trimethoxymethane; dioxolane derivatives; sulfolane; methyl sulfolane; 1,3-dimethyl-2-imidazolidinone; propylene carbonate derivatives; tetrahydrofuran derivatives; ether; methyl propionate; ethyl propionate, or the like.

Examples of the organic solid electrolyte may include polyethylene derivatives, polyethylene oxide derivatives, polypropylene oxide derivatives, phosphoric ester polymers, poly agitation lysine, polyester sulfide, polyvinyl alcohol, polyvinylidene fluoride, polymers having ionic dissociation groups, or the like.

Examples of the inorganic solid electrolyte may include nitrides, halides and/or sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—NiOH, $Li_3PO_4$—$Li_2S$—$SiS_2$, etc.

The lithium salt used herein is a material readily dissolved in the non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, low aliphatic carboxylic lithium, lithium 4-phenyl borate, imides, or the like.

Additionally, in order to improve charge-discharge properties and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethyleneglycol dialkyl ether, ammonium salts, pyrrole, 2-methoxy ethanol, aluminum trichloride, or the like, may be added to the non-aqueous electrolyte. If necessary, in order to impart non-flammability, the non-aqueous electrolyte may further include halogen-containing solvents such as carbon tetrachloride and ethylene trifluoride. Further, in order to improve high-temperature storage characteristics, the non-aqueous electrolyte may further include carbon dioxide gas.

The secondary battery fabricated according to the present invention may be used for a battery cell which is a power source for a small device, and may also be employed as a unit cell of a medium and/or large-scale battery module having a plurality of battery cells, which is a power source for a medium and/or large-scale device.

Preferred examples of medium and/or large-scale devices described herein may include: power tools operated by power from a battery motor; electric automobiles including, for example, electric vehicles (EV), hybrid electric vehicles (HEV), plug-in hybrid electric vehicles (PHEV), etc.; electric two-wheel vehicles including, for example, electric bikes, electric scooters, etc.; electric golf carts, and so forth, without being particularly limited thereto.

BRIEF DESCRIPTION OF THE DRAWINGS

The above and other objects, features and other advantages of the present invention will be more clearly understood from the following detailed description taken in conjunction with the accompanying drawings, in which.

BEST MODE

Hereinafter, exemplary embodiments of the present invention will be described in greater detail with reference to the following examples. However, those skilled in the art will appreciate that these embodiments are proposed for illustrative purposes and do not restrict the scope of the present invention.

Figure 1:
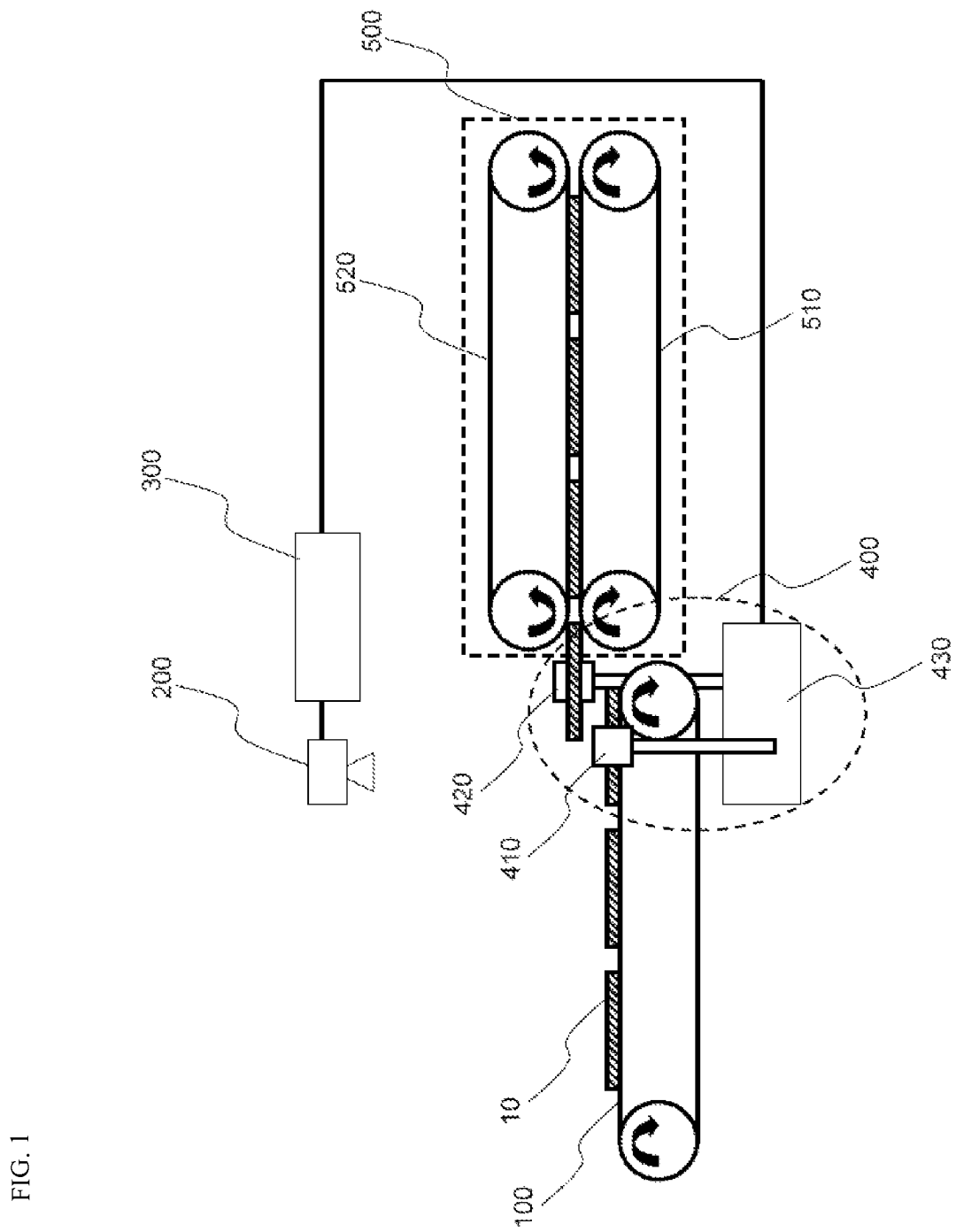
FIG. 1 is a schematic view illustrating a unit cell transfer apparatus according to an exemplary embodiment of the present invention.
Figure 2:
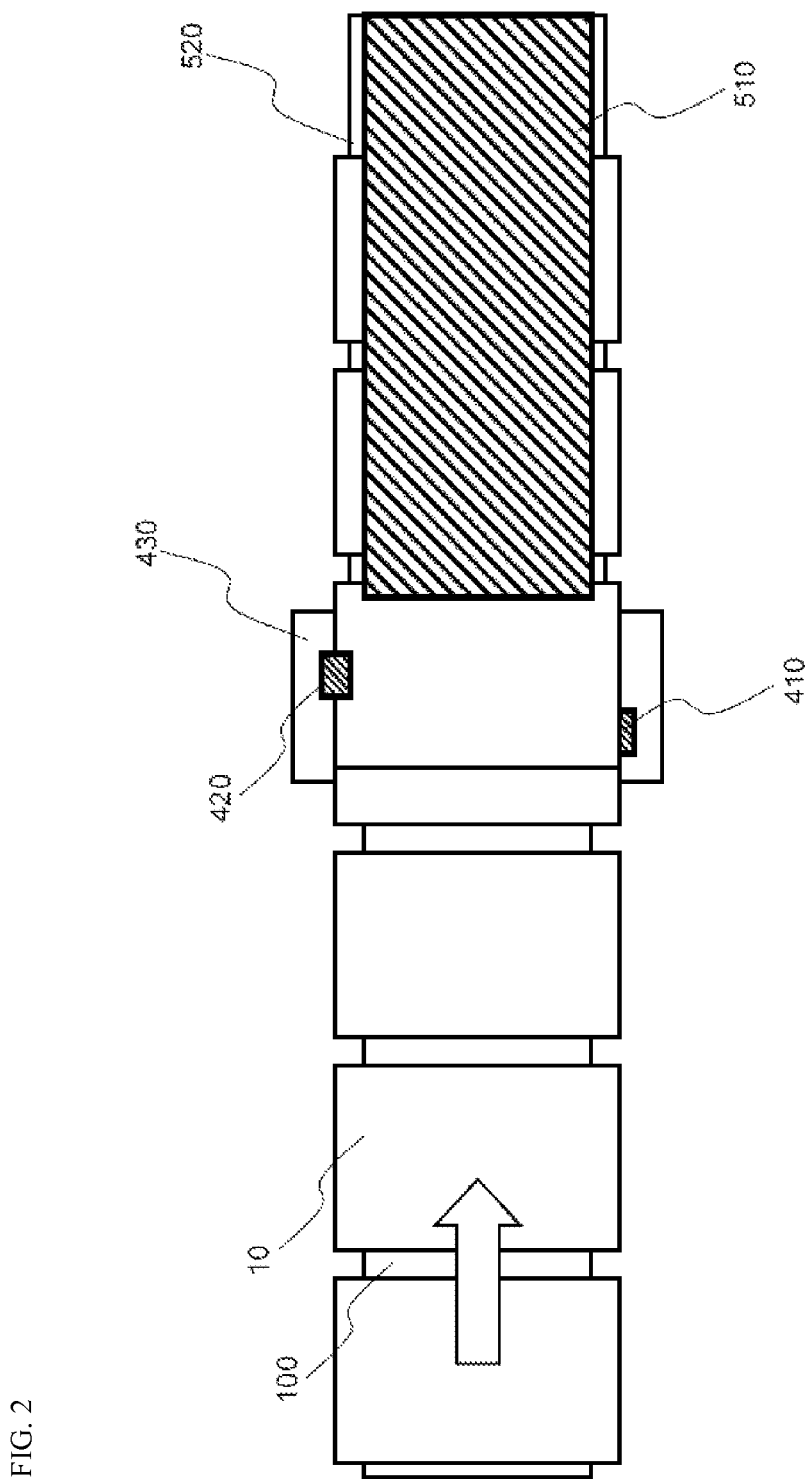
FIG. 2 is a schematic plan view illustrating a unit cell transfer apparatus according to an exemplary embodiment of the present invention.
Figure 3:
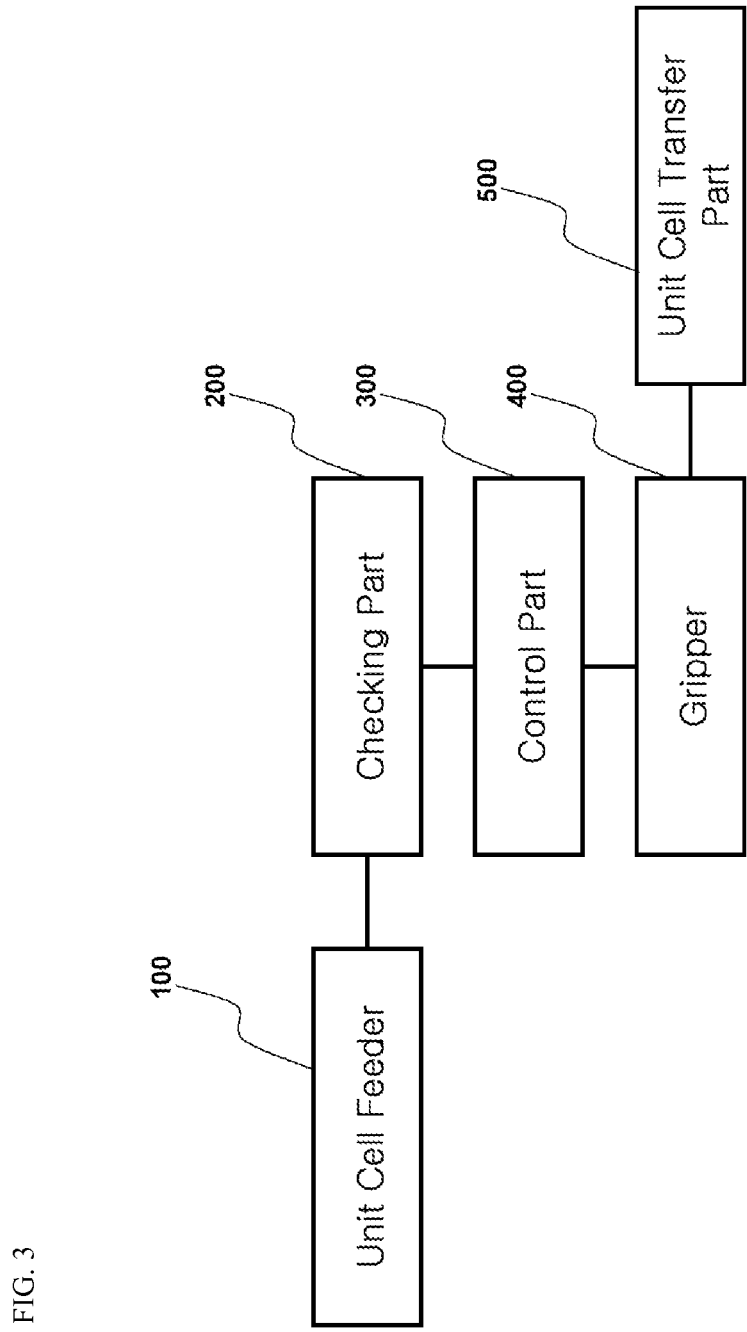
FIG. 3 illustrates the configuration of a unit cell transfer apparatus according to an exemplary embodiment of the present invention.

FIG. 1 is a schematic view illustrating a unit cell transfer apparatus according to an exemplary embodiment of the present invention, FIG. 2 is a schematic plan view illustrating the unit cell transfer apparatus described above, and FIG. 3 illustrates the configuration of the unit cell transfer apparatus.

Referring to the above figures, a unit cell feeder 100 for sequentially introducing unit cells 10 consists of a conveyer belt driven by rollers at both ends thereof, wherein the unit cells 10 are loaded on top of the conveyer belt and introduced.

As such, while a unit cell 10 is stopped for a predetermined time, a checking part 200 capture an image of position information of the unit cell 10 and image information acquired therefrom to a control part 300.

The control part 300 compares the image information with a preset arrangement and, if a deviation in arrangement is found, transmits a position compensation signal for compensating for the compared result to a gripper 400.

The gripper 400 consists of a first gripper 410, a second gripper 420 and a driving part 430 to receive the position compensation signal and drive the first gripper 410 and the second gripper 420. Optionally, the driving part 430 is not included but, instead, the gripper may have a construction of the first gripper 410 and the second gripper 420 functioning as a driving part.

The gripper 400 grips the unit cell 10 stopped for a predetermined time and delivers the same from the unit cell feeder 100 to a unit cell transfer part 500 while compensating for the position according to an instruction for action by the control part 300.

Referring to the figures, a second gripper 420 of the gripper 400 grips a unit cell 10 from the unit cell feeder 100 and delivers the same to the unit cell transfer part 500. Also, when a following unit cell is gripped and delivered by a first gripper 410, the second gripper 420 returns to a position to grip a next one.

The unit cell transfer part 500 includes a pair of conveyer belts having a vertical step relative to the unit cell feeder 100, which are arranged to face each other while rotating in opposite directions. The unit cell 10 gripped by the gripper 400 is inserted between the conveyer belts and then delivered.

The pair of conveyer belts described above may include a bottom conveyer belt 510 having rollers at both ends thereof wherein the rollers rotate clockwise to drive the conveyer belt, as well as a top conveyer belt 520 having rollers at both ends thereof wherein the rollers rotate counter-clockwise to drive the conveyer belt.

The checking part 200 and the control part 300 may analyze the position information by capturing an image of a part of the unit cell 10, for example, both edges of one face of the unit cell. Therefore, when a first unit cell randomly selected and held up in a vertical direction by the gripper 400, the unit cell feeder 100 may continuously move unit cells, thereby enabling a second unit cell to be located vertically below the first unit cell. Therefore, the second unit cell partially overlaps with the first one in viewing from top side. A camera of the checking part 200 captures an image of non-overlapping part and, when the gripper 400 transfers the unit cell to the unit cell transfer part 500, position compensation may be executed.

Accordingly, alignment may performed while the unit cells 10 are overlapped, thereby enabling the processing speed to be highly enhanced.

Although preferred embodiments of the present invention have been described above in conjunction with the accompanying drawings, those skilled in the art will appreciate that various modifications and variations are possible without departing from the scope and spirit of the invention, based on the foregoing description.

INDUSTRIAL APPLICABILITY

As apparent from the foregoing, the unit cell transfer apparatus according to the present invention may effectively align unit cells and improve processing rate, thus enhancing processing speed.

The invention claimed is:
1. A unit cell transfer apparatus for arranging and delivering unit cells to a folding device, which is used in a continuous process for manufacturing a stack/folding type electrode assembly having a structure of planar unit cells wound up over a separate film, comprising:
   a unit cell feeder to introduce unit cells in sequential order;
   a position checking part that captures an image of a position of the unit cell in the unit cell feeder to acquire an image signal and then transmits the image signal to a control part described below;
   the control part that confirms aligned conditions of the unit cells on the basis of image signals received by the checking part to control behavior of grippers described below;
   two or more grippers, each of which grips unit cells fed from the cell feeder one unit at a time and then delivers the unit cells to a transfer part described above, after position compensation of the unit cell according to a position compensation signal provided by the control part; and
   the unit cell transfer part for delivering the unit cells described above to a folding device,
   wherein the unit cell transfer part has a pair of conveyer belts arranged to face each other while rotating in opposite directions, and wherein the unit cell is inserted between the conveyer belts and delivered.

2. The apparatus according to claim 1, wherein the unit cell is a bi-cell or a full cell.

3. The apparatus according to claim 1, wherein the unit cell feeder is a conveyer belt, and the unit cells are loaded on top of the conveyer belt and introduced.

4. The apparatus according to claim 1, wherein the checking part is a camera mounted on the top of the unit cell feeder and generates an image signal acquired by capturing an image of only a part of the unit cell.

5. The apparatus according to claim 4, wherein the checking part generates the image signal acquired by capturing images of both edges of one face of the unit cell.

6. The apparatus according to claim 1, wherein the control part compares an arrangement of the unit cells according to the image signal with a preset arrangement and, when there is a difference between the unit cell arrangement and the preset arrangement, transmits position compensation signal for compensating for the difference to the gripper.

7. The apparatus according to claim 1, wherein the gripper includes a first gripper and a second gripper to grip the unit cells by turns, and wherein the second gripper returns a gripping position while the first gripper grips a unit cell and delivers it to a unit cell transfer part, and starts to transfer the following unit cell at a point of time at which a delivery process of the first gripper is terminated.

8. The apparatus according to claim 7, wherein the first gripper and the second gripper are located at left and right sides relative to a direction of moving the unit cells to the unit cell transfer part.

9. The apparatus according to claim 1, wherein the unit cell feeder and the unit cell transfer part are adjacent to each other, and have a vertical step at the adjacent site between the unit cell feeder and the unit cell transfer part such that unit cells in the unit cell feeder move vertically and are delivered to the unit cell transfer part.

10. The apparatus according to claim 9, wherein a second unit cell moves to an overlap position at the bottom of the first unit cell while the first unit cell migrates vertically relative to the vertical step and is transferred to the unit cell feeder.

11. The apparatus according to claim 10, wherein a protruded sill is formed outside a driven roller in the unit cell feeder adjacent to the unit cell transfer part, and wherein the sill contacts a front part of the second unit cell to stop movement of the unit cell when the gripper grips the unit cell.

12. The apparatus according to claim 9, wherein the vertical step has a height of 3 to 10 mm.

13. A stack/folding type electrode assembly fabricated using the apparatus according to claim 1.

14. A secondary battery including the stack/folding type electrode assembly according to claim 13.

15. A unit cell transfer apparatus for arranging and delivering unit cells to a folding device, which is used in a continuous process for manufacturing a stack/folding type electrode assembly having a structure of planar unit cells wound up over a separate film, comprising:

a unit cell feeder to introduce unit cells in sequential order;

a position checking part that captures an image of a position of the unit cell in the unit cell feeder to acquire an image signal and then transmits the image signal to a control part described below;

the control part that confirms aligned conditions of the unit cells on the basis of image signals received by the checking part to control behavior of grippers described below;

two or more grippers, each of which grips unit cells fed from the cell feeder one unit at a time and then delivers the unit cells to a transfer part described above, after position compensation of the unit cell according to a position compensation signal provided by the control part; and the unit cell transfer part for delivering the unit cells described above to a folding device, wherein the unit cell feeder and the unit cell transfer part are adjacent to each other, and have a vertical step at the adjacent site between the unit cell feeder and the unit cell transfer part such that unit cells in the unit cell feeder move vertically and are delivered to the unit cell transfer part, wherein a second unit cell moves to an overlap position at the bottom of the first unit cell while the first unit cell migrates vertically relative to the vertical step and is transferred to the unit cell feeder, and wherein a protruded sill is formed outside a driven roller in the unit cell feeder adjacent to the unit cell transfer part, and wherein the sill contacts a front part of the second unit cell to stop movement of the unit cell when the gripper grips the unit cell.

* * * * *